United States Patent

Budnik et al.

[15] 3,664,037

[45] May 23, 1972

[54] INSTRUCTION DEVICE WITH A PLURALITY OF MODES

[72] Inventors: Roger J. Budnik, Milwaukee; Harold S. Montgomery, Fox Point; David J. Nutting, Milwaukee, all of Wis.

[73] Assignee: Nutting Industries, Ltd., Milwaukee, Wis.

[22] Filed: Oct. 20, 1969

[21] Appl. No.: 867,669

[52] U.S. Cl. ....................35/9 B
[51] Int. Cl. ....................G09b 7/08
[58] Field of Search ....................35/9, 9 B, 9 E

[56] References Cited

UNITED STATES PATENTS 3,355,818 12/1967 Whitehorn ....................35/9

*Primary Examiner*—Wm. H. Grieb
*Attorney*—Andrus, Sceales, Starke & Sawall

[57] ABSTRACT

A film projector presents film frames in sequence. The lateral edge of the film adjacent each frame is a dark surface having eight code spots for answer selection and a three bit binary code. The code spots are dark or clear and read by a photocell. A sound tape machine includes three audio channels and a control channel having a high frequency advance signal and a low frequency tape stop signal. A binary decoder establishes output power at one of a plurality of power lines. A matrix board connects the power leads to control lines through diodes. The control lines are connected to branch circuits of a master control to operate the film projector and the tape machine in predetermined sequences with the output of the tape machine establishing an automatic film advance or a semi-automatic film advance. A film frame may provide a question and multiple choice answers. A response circuit includes a correct answer relay and an incorrect answer relay selectively connected in the master circuit to establish an interrelated control of the projector and tape machine.

27 Claims, 7 Drawing Figures

INVENTORS
ROGER J. BUDNIK
HAROLD S. MONTGOMERY
DAVID J. NUTTING
BY
Andrus, Sceales, Starke & Sawall
Attorneys INVENTORS.
ROGER J. BUDNIK
HAROLD S. MONTGOMERY
DAVID J. UTTING
BY
Andrus, Sceales, Starke & Sawall
Attorneys INVENTORS
ROGER J. BUDNIK
HAROLD S. MONTGOMERY
DAVID J. NUTTING
BY
Andrus, Sceales, Starke & Sawall
Attorneys INVENTOR.
ROGER J. BUDNIK
HAROLD S. MONTGOMERY
DAVID J. NUTTING
BY
Andrus, Sceales, Starke & Sawall
Attorneys

INSTRUCTION DEVICE WITH A PLURALITY OF MODES

BACKGROUND OF THE INVENTION

This invention relates to an instruction device with a plurality of modes of presentation of information means and related reinforcing means.

More particularly, the device of the invention is directed to the use of audio and/or related visual stimulus in the process of instructing or informing a person relative to any desired subject matter. The instruction may be in the form of a visual presentation only, such as from projected film. Alternatively, it may be in the form of a pure audio presentation, such as from a pre-recorded tape. It may also combine the two types of presentation in various combinations. In addition, the presentation may include a form of question and answer program, which requires actual participation by the user, with selected audio reinforcement before and after answer selection.

For some time, it has been possible to connect a sound tape recorder with a separate film projector whereby a running commentary is made relative to the film being projected, with the two systems operating in some type of synchronism. In addition, visual question and answer devices have been developed wherein a series of questions are presented, one at a time, with the operator making a choice between multiple presented answers. These question and answer devices often have utilized scoring techniques to inform and advise the operator as the "game" progresses. Such question and answer devices are disclosed, for example, in U.S. Pat. 3,300,875 and U.S. application Ser. No. 776,988, filed Nov. 19, 1968 by the present inventor, and entitled INSTRUCTIONAL DEVICE.

SUMMARY OF THE INVENTION

The present invention is based on substantial refinements and improvements in the concept of multi-media presentation means and particularly visual instruction means.

As generally contemplated, the device of the invention is provided with means for receiving multiple inputs from a source or sources operated by or in synchronism with both audio and visual information, such as magnetic tape and picture film. Both the tape and film may be mounted coaxially side-by-side in a combined audio-visual cartridge with a separate drive. The visual information on the film is projected by the device to a screen for observation by the operator. The audio information on the tape is amplified by the device and presented to the operator through a suitable loud speaker.

In accordance with the invention, the actuating means for the audio and visual presentations are interconnected through circuitry for selective operation thereof in response to control inputs provided on the audio and visual media themselves. The picture film is also provided with multi-channel control signal means, such as selectively positionable transparent portions, which operate through the circuitry to govern the type of operation of the device. The audio magnetic tape is also provided with control signal means, such as on one or more signal tracks, which operate through the circuitry to stop the tape and drive the film advance mechanism.

The invention contemplates a unit which is operable in a plurality of modes, such as the following:

Mode 1: (Visual Information Mode)

Means are provided which respond to a selected film control signal means to exclusively activate only the film advance circuitry whereby the film is advanced upon manual operation of a switch. The circuitry in this mode permits presentation of only one picture frame for each manual actuation of the switch. A pure visual instruction is thus obtained.

Mode 2: (Audio Information Mode)

Means are provided which respond to selected film control signal means to automatically actuate the tape drive and playback circuitry. If there is more than one audio channel on the tape, the film control signal means may select any one of the desired channels. During this period, the manual film advance switch circuitry is de-activated during the audio transmission. Alternative means responsive to alternative control signals on the tape serve to de-activate the tape drive and playback circuitry to thereby stop the tape, and at the same time control the film advance circuitry, if desired. One such means stops the tape and activates the manual film advance circuitry to permit film advance according to Mode 1. The other such means stops the tape and automatically advances the film.

Mode 3: (Visual Questions and Answer Mode)

In this instance, means are provided which respond to a selected film control signal means to create a question and answer type operation. The film picture presents a question with a plurality of possible answers. The film also contains an answer indicia whereby, if the operator pushes an incorrect answer button, the device visually or audibly advises him of this fact. By the same token, if the operator pushes the correct answer button, he is also so advised. If the correct answer button is pushed, the manual advance switch circuitry is activated thereby so that the operator can advance the film to the next question, if he desires. In this mode, the tape drive and playback circuitry is de-activated.

Mode 4: (Visual Question and Answer Mode With One Channel of Audio)

This mode is similar to Mode 3, except that the question and answer operation includes an audio message before the operator answers the question and also after the operator gives the correct answer and before the next question is presented. Thus, means are provided which are responsive to a selected film control signal means to actuate the tape drive and playback circuitry while maintaining the question and answer circuitry in disabled condition. At the end of the audio message, a signal on the tape will serve to stop the latter and at the same time activate the question and answer circuitry. If an incorrect switch is operated, the operator cannot advance to the next question until the correct answer is selected. He, therefore, actuates the answer buttons until the correct answer is selected. The circuit then responds by actuating the tape drive and playback circuitry for a further audio message. At the end of the message, a tape signal will operate the device, as described in Mode 2, to stop the tape and permit manual or automatic film advance.

Mode 5: (Visual Question and Answer Mode With Two Channels of Audio)

In some instances, it may be desirable to provide an audio message commensurate with whether the operator has pushed either a correct or incorrect answer button. Since the message would normally be different, depending upon whether a correct or incorrect answer input is provided, a pair of side-by-side audio channels with correspondingly different audio messages are provided on the tape. The first channel contains the pre-question message and a subsequent message relating to a correct answer. If the operator pushes the correct answer button on the first try, the mechanism operates as in Mode 4. However, if the first try is an incorrect answer, the circuit responds to a selected film control signal means by activating the tape drive and playback circuitry so that the second audio channel is played back. At the end of the message, a tape signal will stop the latter and re-activate the question and answer circuitry to permit a second try for the correct answer. An interlock prevents re-activating of the tape if an incorrect answer is again given, and the device subsequently operates as in Mode 4. If desired, the tape could be programmed to automatically advance the film instead of giving the operator the opportunity to have a second try for the correct answer.

Mode 6: (Visual Question and Answer Mode with Three Channels of Audio)

In Mode 5, the audio message on the tape channels cannot relate specifically to the particular answer given, assuming that there are five possible answer inputs with only two channels. In the present mode, the invention contemplates the use of an equal number of audio channels and possible answer inputs, such as three. Thus, each answer is provided with a mutually exclusive audio channel of its own. Circuit means is provided which is responsive to the film control signal means whereby the providing of any of three answers by the operator whether right or wrong, will activate the tape drive and playback circuitry and provide an audio message on the specific channel corresponding to the answer button pushed. If the answer is correct, a tape signal at the end of the message will stop the tape or advance the film. If the answer is incorrect, the tape signal will be programmed to stop the tape, if desired, and re-activate the question and answer circuitry to permit a second try, as in Mode 5 or advance the film.

Mode 7: (External Control Mode)

The present embodiment of the invention contemplates probable use of a strip film type of visual media wherein each picture frame is individually observed. In some instances, it may be desirable to provide a motion picture or other supplemental visual presentation in addition to the visual and audio presentation of the device itself. The invention therefore contemplates the provision of an external control circuit into which a supplemental device may be connected. This external circuit is energized in response to a selected film control signal means, to operate a projector or the like. It is contemplated that the film control signal means will also actuate the tape, as in Mode 4, to provide a running commentary for the external presentation.

Mode 8: (Selective Audio Information Mode)

In some instances, when a given film frame is presented, or without use of a film presentation, it may be desirable to provide one of a plurality of sound presentations. The device therefore also provides a manually actuated input means to separately actuate the tape drive and playback circuitry wherein a selected one of a plurality of audio channels may be played back by actuation of a corresponding answer input button. In effect, the operation is like Mode 6, except that the question and answer circuitry and the decoder is disabled, and only the audio circuitry operates.

The device of the invention will operate in a particular mode as long as a particular film frame remains in position in the machine. That mode may continue as the film advances, provided that the control signal means on the film remains the same on each frame. As soon as a different film control signal is provided, the mode will change.

More particularly, the present invention employs a multiple channel coded input control source having a code input means coupled to the presentation means. The multiple channels are coded to provide a unique signal combination in accordance with a particular mode of operation. The signal source is connected to a suitable reader which detects the desired mode of operation and transmits the code into a decoding circuit having a plurality of outputs, one for each mode of operation with the output interconnected to a master control circuit for the presentation means and the reinforcing means.

The presentation means may be a film, or any other suitable visual display means which is adapted to present information in sequence. A code carrier is interposed between successive frames or preferably extended laterally along one edge of the film. In a highly satisfactory system, the lateral edge of the film adjacent the frames is formed as a relatively, continuously dark surface. The film is divided into laterally spaced code channels with the code provided for the aligned frame by appropriate light-transmitting openings. The projector lamp, or any other source of light, is disposed to one side of the film and a suitable light sensitive pickup is provided to the opposite side with a separate pickup aligned with each of the several channels and interconnected into a coding circuit connected to a decoding circuit having respective mode operation channels establishing a plurality of related outputs. The output channels are each connected as an input to a matrix circuit having a plurality of output or control lines interconnected to a master control circuit. Each input interconnects the several control lines to operate the visual presentation unit and the audio presentation unit into the desired operating mode. In addition, the audio unit provides interlocking signals to provide selected control of the programs within certain modes.

Thus, it may provide for an automatic, sequential presentation of the visual information frames in accordance with a predetermined response and/or a holding of the units in a given position until a subsequent manual control is inserted.

When employed in connection with question-and-answer type presentation, the code carrier is conveniently provided with correct answer information channels having an appropriate light-transmitting opening in the correct answer channel for the related frame.

In a highly satisfactory and practical construction of a unit incorporating question and answer operating modes, the film is constructed with an eight-code channel carrier to the one side of the film. Five channels provide correct answer information and three channels provided a binary bit code information or input. The individual photocell unit for the several channels, related to the proper answer control, is interconnected to the pushbutton selection switch circuit. The binary code channels photocells are connected to control a transistorized decoding circuit, including a pair of transistors for each channel, one for each of the three bits in a three bit binary code. Each pair of transistors is similarly connected such that one transistor conducts with the opposite transistor cutoff. The photocell is interconnected to reverse the conductive state of the two transistors. This provides a pair of output signal leads at the respective transistors and a total of six code signal lines, two for each bit. The signal code lines are interconnected into three bit diode decoding logic networks, one for each mode of operation. Each network requires that a corresponding binary signal be applied to each of the inputs, with the six signal lines providing the necessary unique input such that only one mode selection channel line is connected to the power supply at any given time. The several output circuit lines form one set of a related line of a diode matrix switch unit. Each of the output circuit lines is selectively connected by steering diodes to control lines interconnected to the master circuit and particularly providing power to the several circuits for controlling of the film means and the audio means, in particular modes or sequences.

The diode matrix switch unit is preferably formed as a diode matrix board having a plurality of parallel lines selectively connected to the master circuit. Perpendicularly related parallel lines are connected one each to each of the mode control sections or circuits of the decoding circuitry. The respective lines are insulated from each other with openings at the interconnecting or crossing points provided to accept a diode unit as a plug-in for interconnecting of the lines at such points. In this way, the machine can be interconnected for a desired mode of operation and subsequently interchanged for other modes of operation merely by re-aligning and positioning of the plug-in type diode units.

The master circuit may employ suitable interlocking relay circuitry, solid state switching circuitry, or the like, to establish the several different sequential modes. The audio information means is advantageously constructed as a magnetic multiple channel tape unit having various channels of sound information selectively connected into the output circuit in accordance with the master circuit connection to provide audio reinforcement in accordance with the selection of a correct or incorrect answer, for example. In addition, the tape includes a control channel having a first frequency tone signal operative to control the stopping of the tape motor without initiating action of the visual presentation means. In this mode, a manual start is required to re-initiate operation. Alternatively, a different frequency tone signal directly operates the film advance control means while simultaneously stopping the tape machine and advancing of the film to the next desired frame.

The present invention thus provides an informational apparatus which may be conveniently and rapidly connected to accommodate many combinations of different presentation modes.

Figures 1, 2:
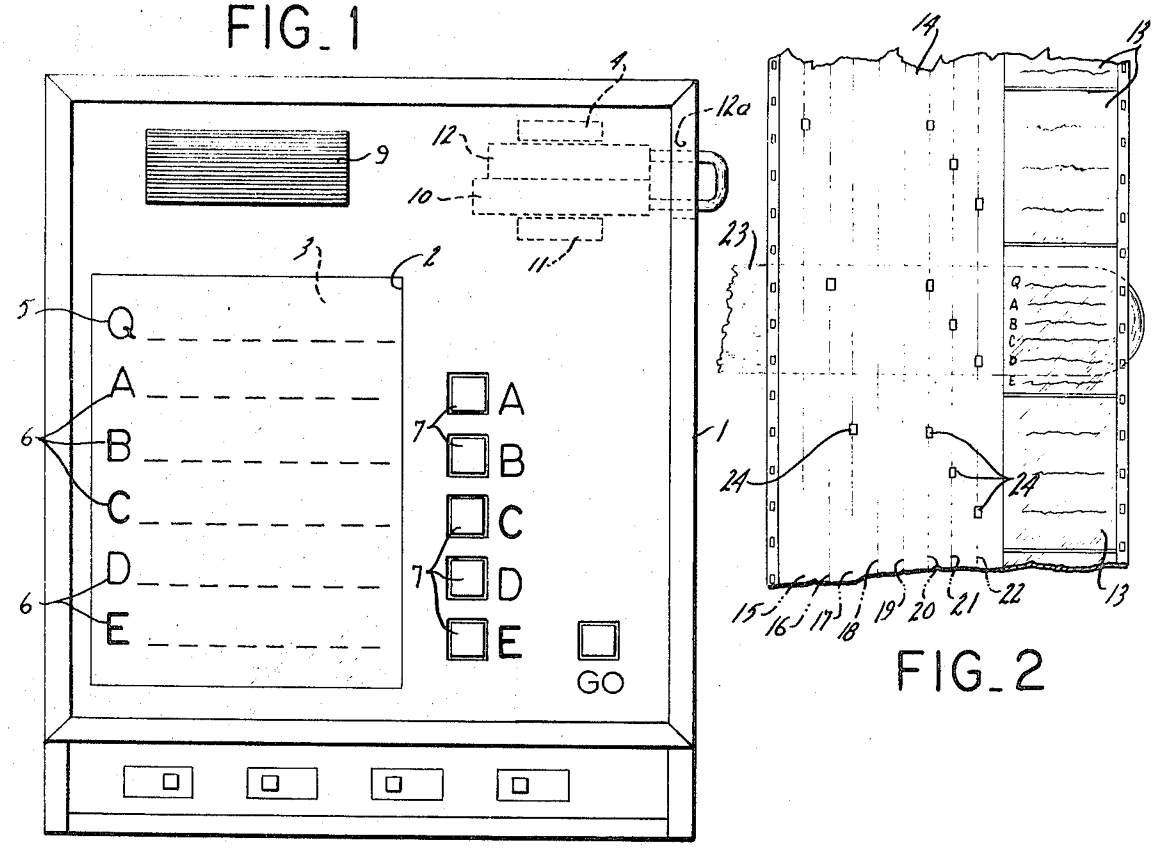
FIG. 1 is a diagrammatic elevational illustration of an instructional device constructed in accordance with the present invention.
FIG. 2 is a fragmentary elevational view of a film strip, particularly adapted for use in the present invention.
Figures 5, 7:
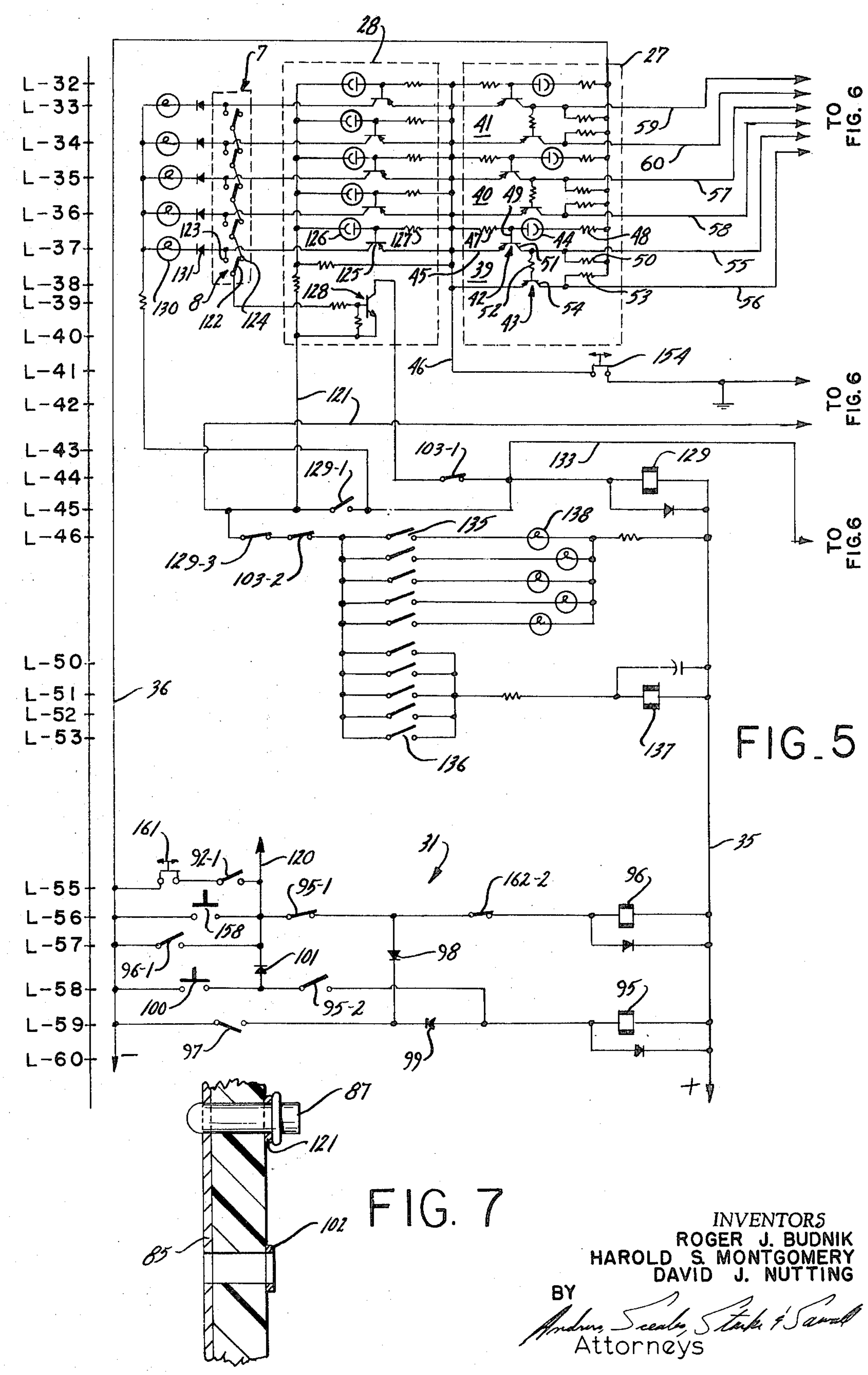
FIG. 5 is a schematic circuit illustration of an answer selection and response section, a code reading circuit section, and a part of the master control circuit.
FIG. 7 is a fragmentary vertical section through a matrix board shown in FIG. 6.

Referring to the drawings and particularly to FIG. 1, the illustrated embodiment of the invention is shown including an outer enclosure or housing 1 having a film presentation opening 2 behind which the film 3 is mounted and interconnected to a film drive motor 4 for sequentially stepped presentation of sequential film frames. Each of the film frames is provided with a question 5 and a series of five possible answers 6 in the illustrated embodiment of the invention. Corresponding five answer pushbuttons 7 are provided with corresponding letter identifications A, B, C, D and E such that the operator can select the desired answer by actuation of the related pushbutton. The pushbuttons 7, in turn, each actuate a related switch 8, as shown in FIG. 5, with various modes of operation, depending upon the particular connection of the circuit in response to correct and incorrect answers.

As more fully described hereinafter, visual information may, of course, be made without requiring answer and the visual information may be accompanied by audio reinforcement. Thus, a speaker 9 is provided interconnected to a tape pack 10 which is preferably constructed as an endless tape construction which is releasably driven by a tape drive motor 11. The energization of motor 11 is interrelated to the operation of the film drive motor 4 to present the audio information related to the particular film frames. In a preferred construction, the film 3 is carried as an endless film in a suitable film pack 12 which is mounted immediately adjacent and interconnected with the tape pack 10 to form an integrated structure which can be inserted and removed through a suitable opening 13 in the housing. The drive motors 4 and 11 are positioned with releasable coupling mechanisms which automatically connect and disconnect to the respective film pack 12 and tape pack 10.

As previously noted, the particular sequence and modes of presenting the information carried by the film pack and by the tape pack 11 may be widely varied, depending upon the particular purpose of the presentation and furthermore, within any one total presentation, the particular interrelationship may be desirably varied. Thus, with certain parts of the visual information, it may be desirable to provide audio information, either before, after, or before and after. In other cases, it may be desired to completely eliminate the audio information and merely present the visual information. In still other instances, it may be desired to present only audio information. The present invention is particularly directed to a coded control system for establishing any desired mode of operation for any given presentation frame and a preferred construction employing a binary code system is shown in FIGS. 2 through 6, inclusive.

Referring particularly to FIG. 2, a fragmentary portion of the film 3 is shown in elevation. The film 3 includes the several presentation frames 13, each of which is provided with a question 5 and a series of answers 6, or merely with information. Immediately aligned and shown as an extension of the film 3, is an opaque light interrupting control section 14. The code control section or area is shown provided with eight channels shown by phantom lines, with lines 15 through 19 constituting correct answer selection channels and channels 20, 21 and 22 constituting binary coded mode selection channels. The film 3 is mounted in any suitable manner with respect to the projection lamp 23 to illuminate the one side of the film 3 and thereby transmit the information in the presentation frames 13 and also to provide illumination to the one side of the control section 14. The several channels 15 through 22 are selectively provided with light-transmitting area, shown as small rectangular openings 24 in one or more channels for each presentation frame 13. In actual practice, the code may be provided at selected eight spot-like portions arranged in a selected pattern as the code is established by the presence or absence of a opening 24. Thus, in connection with answer-selection portions or channels 15 through 19, there will normally be a single correct answer and consequently only one of the channels will be provided with an opening. This constitutes a correct answer selection. The binary code channels 20, 21 and 22 are provided with openings in accordance with a three bit binary code to which the present system is constructed. Thus, the provision of a light-transmitting opening 24 will transmit a light signal and thus may be related to the binary signal, whereas maintaining the light interruption prevents transmission of a light signal, and therefore relates to a binary 0 output. The three channels thus provide a three bit binary code. The binary code output is connected into a code reader circuit as more fully described hereinafter to provide a coded control of the drive motors 4 and 11.

Figure 3:
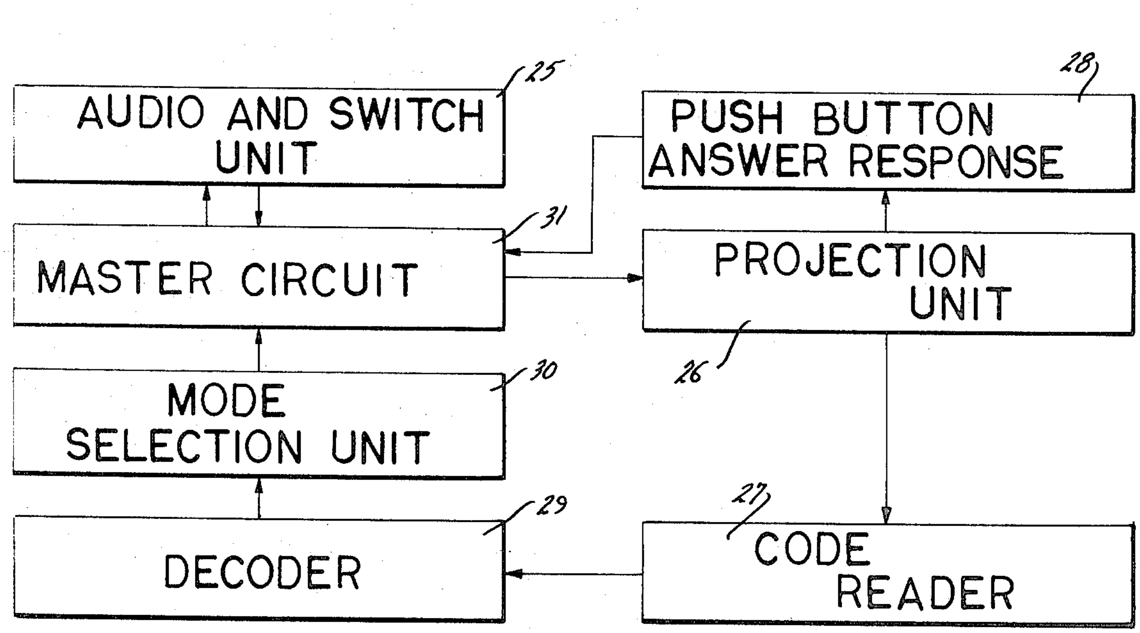
FIG. 3 is a block diagram of a preferred control circuitry, as shown in greater detail in FIGS. 4 through 6, inclusive.
Figure 4:
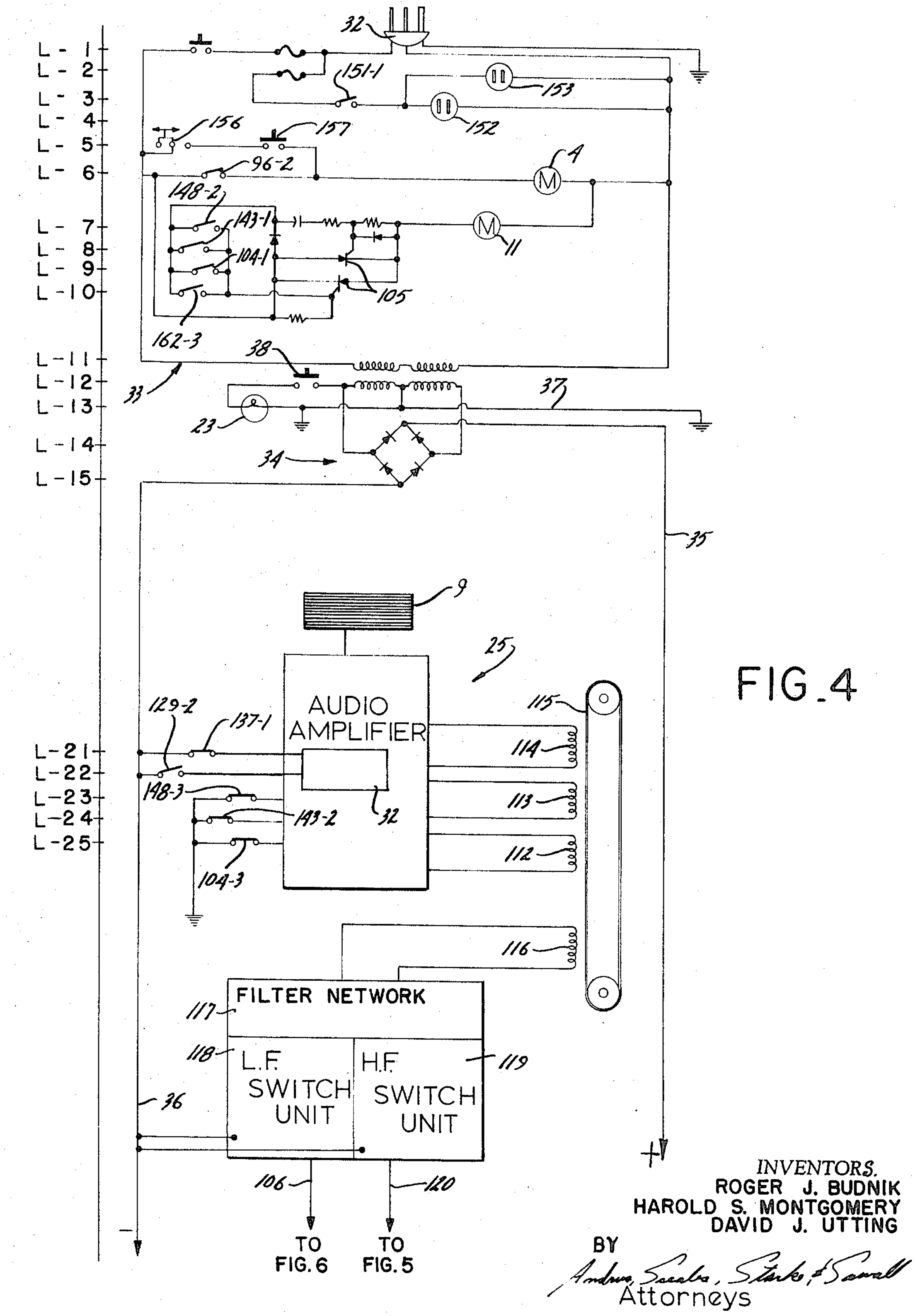
FIG. 4 is a schematic circuit diagram showing the alternating current power supply, a D.C. control converter and an audio response and switching circuit, forming a part of the block diagram shown in FIG. 3.
Figure 6:
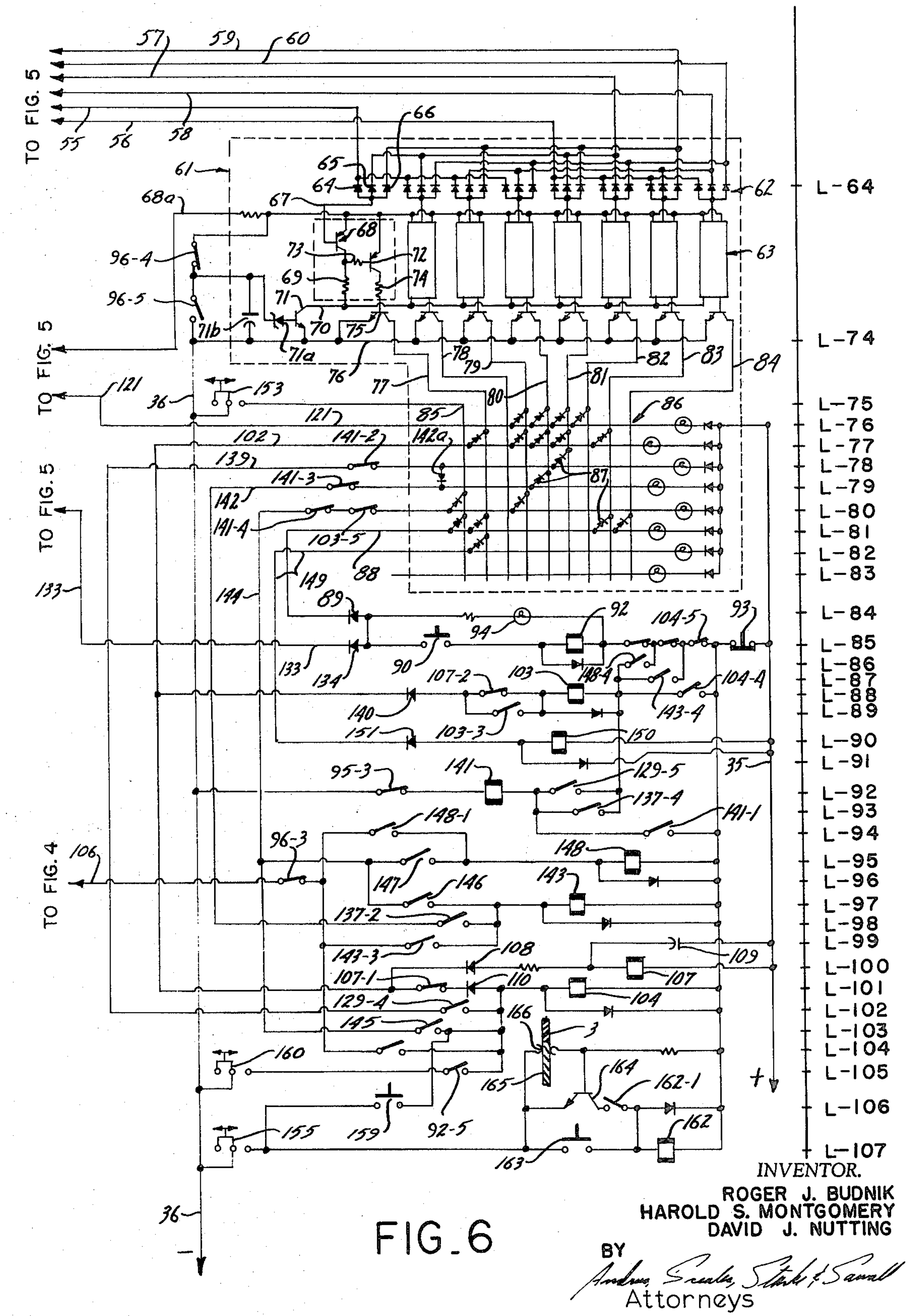
FIG. 6 is a schematic circuit diagram of the decoding circuit and the interconnection to the master control circuit for controlling the interrelated operation of the film projection means and the audio means.

A simplified block diagram of a control circuit is shown in FIG. 3 and a preferred schematic diagram is shown in FIGS. 4 through 6, inclusive.

Referring particularly to FIG. 3, the audio unit 25 and projection unit 26 are shown in block diagram with the projecting unit connected as the input to a code reader 27. A decoder 29 is connected to the code reader 27 and operates a mode selection circuit or unit 30 in accordance with the code information in channels 20, 21 and 22. The mode selection circuit or unit 30 is connected to a master control circuit 31 which controls the operation of projection unit 26 and audio unit 25. In addition, a push button answer and response unit 28 is connected into the master control circuit 31 to permit certain interlocking operation in response to correct and incorrect responses. Further, the audio unit 25 produces an output which is interconnected to the master control circuit 31 to provide automatic or semi-automatic operation of the projection unit 26 and therefore the coded control of the system.

A preferred construction of the control and operating circuitry is shown schematically in FIGS. 4 through 6, inclusive. The several schematic circuit diagrams are shown in an across-the-line illustration with the several lines provided with identifying numbers distinguished from the element numbers by the prefix L- and with the interconnecting lines between the several circuits identified by corresponding element numbers. Further, in the circuit, the several relays are provided with identifying legends and all of the related contacts are identified by the corresponding number and a following subnumber.

Referring particularly to FIG. 4, the power connection for the control circuitry is illustrated including a conventional three-wire, alternating current input 32, which may of course be connected to the conventional 60-Hertz power system employed in the United States and of a nominal voltage of 110 to 130 volts. The control circuitry includes an alternating current drive section 33 for providing power to the projector, and in particular, to the projector drive motor 4 and the tape drive motor 11, as hereinafter more fully developed.

A D.C. converter supply 34 is connected to the alternating current input 32 to produce a suitable low voltage control power for operating of the control and logic circuitry, which in turn is interconnected through suitable relays to the A.C. drive section 33. In the illustrated embodiment of the invention, the D.C. supply 34 is shown as the well-known transformer rectifier assembly, including a full-wave, single-phase rectifier connected to the A.C. supply 32 through a suitable transformer, having a tapped secondary to establish a D.C. supply, including a positive line 35, a negative line 36 and a common or ground line 37. The D.C. voltage may be of the order of 12 volts or the like to produce a highly satisfactory control circuitry in accordance with well known circuit design. The D.C. power lines are connected to the control circuitry shown in FIGS. 4, 5 and 6, and the lines are correspondingly numbered in the several circuits. The extension of the lines 34–36 from one FIG. to the next is indicated by properly arrowed and labeled terminals or lines. The lines are also provided with a corresponding plus (+) or minus (−) sign to indicate the polarity and the relationship thereof with respect to the D.C. supply.

In the illustrated embodiment of the invention, the projection light 23 is shown connected across one side of the transformer of the D.C. supply to provide an appropriate voltage to the lamp. An on-off switch 38 may be provided at line L–12 to control the energization of the lamp 23.

Referring particularly to FIG. 5, the decoding circuit or reader 27 is shown including three separate channels 39, 40 and 41, one channel for each of the binary code channels 20, 21 and 22 of film 3. Each of the circuits 39, 40 and 41 is similarly constructed and consequently circuit 39 is described in detail for purposes of describing the present invention.

Generally, circuit 39 includes a pair of logic transistors 42 and 43 shown as PNP-type transistors connected in a common emitter configuration. The transistor 42 is controlled by a photocell 44 which is aligned with channel 20 of the film 3. The photocell 44 provides an impedance related to the illumination level and is connected to normally hold the transistor 42 in the off or non-conducting condition. Thus, the transistor 42 has its emitter 45 connected to a ground lead 46, which is connected to the common or ground lead 36. A resistor 47 in series with the photocell 44 and a limiting resistor 48 is connected between the ground lead 46 and the negative D.C. power lead 36. The base 49 of the transistor 42 is connected to the junction of the resistor 47 and the photocell 44. With the photocell not illuminated, it provides an essentially high impedance circuit thereby preventing sufficient turn-on voltage across the base to emitter circuit of the transistor 42. When the cell is illuminated, however, its resistance drops and permits sufficient current to flow to turn the transistor 42 on. A collector resistor 50 connects the collector 51 of transistor 42 to the negative lead. Withe transistor 42 off, the collector is at a relatively negative potential. When the transistor 42 is turned on, the collector 51 is essentially grounded to provide a stepped voltage signal change from negative to ground potential.

The transistor 43 has its base connected through a base resistor 52 to the collector 51. The emitter is grounded and a collector resistor 53 interconnects the collector 54 to the negative lead 46 similar to the connection of transistor 42. With the transistor 42 cut off, the base is connected to the negative potential at the collector 51 of transistor 42. This permits a turn-on current to flow through the emitter to base circuit of the transistor 43 and thereby normally biases the transistor 43 in to the conductive state. As a result, the collector 54 is held at a relative ground potential. When transistor 42 conducts, the collector 51 drops to ground and thus establishes a relatively ground potential to the base of transistor 43. As the emitter of transistor 43 is also at ground, the transistor 43 cuts off when transistor 42 turns on and provides a corresponding increase or negative voltage at the collector 54 of transistor 43. A binary bit signal line 55 is connected to the collector 51 of transistor 42 and a second binary bit signal line 56 is similarly connected directly to the collector 54 of transistor 43.

Thus, the present embodiment employs negative logic with the binary 0 number represented by ground or relatively zero potential and a binary 1 represented by a negative voltage. Thus, binary bit line 55, which is connected to the normally off transistor 42, is at a binary 1 level in the standby position and switches to a binary 0 on energization of the photocell 44. The line 56 correspondingly is normally at ground or binary 0 and switches to a binary 1 in response to turn-on of transistor 42 and turn-off of transistor 43.

Circuits 40 and 41 have similar related binary output lines 57, 58 and 59 and 60, respectively. The six output lines 55–60 are interconnected to the binary decoder 29 which is illustrated, in some detail, in a preferred construction in FIG. 6. Generally, the decoder 29 includes a plurality of similar mode selection channels 61 of which one channel is shown and described in detail. The illustrated channel 61 includes a three input diode AND gate or circuit 62 controlling a transistor switch 63. The AND circuit 62 consists of three similar diodes 64, 65 and 66 having their cathodes interconnected to selected ones of the lines 55 to 60, inclusive. The anodes of the diodes 64 through 66 are interconnected in each channel to a common signal anode line 67 which is connected to the related switch 63.

The switch 63 includes a first transistor 68 having its base interconnected to the line 67 and the emitter connected directly to ground through a common resistor **68*a*. A collector resistor 69 interconnects the collector to the negative power line or lead by a disable transistor 70. The disable transistor 70 has its base to emitter circuit connected between the common ground lead and the negative control lead 36 and is thus to complete the output circuit connection of transistor 68. The base to emitter circuit includes a Zener diode 71*a* connected to the flux base and a timing capacitor 71*b* connected across the input circuit. The transistor 68 thus has its base circuit controlled by the condition of diodes 64 through 66 and in particular, if any diode is connected to a signal line 55 through 60, inclusive, which is at a negative potential relative to ground, the transistor 68 is biased on. Thus, the emitter is connected to ground and will provide current through the emitter to base circuit through the diodes 64, 65 or 66 and the associated negative lead to the reader and then to the negative control power line 36. In the illustrated embodiment of the invention, channel 8 has its three diodes connected respectively to the binary lines 55, 57 and 59 of the respective channels 39, 40 and 41. Each of these lines is connected to the collector of the transistors 42 in the respective channels and thus, each normally has applied thereto a negative potential. Therefore, the transistor 68 will continue to conduct until such time as all three of the channels 39, 40 and 41 are switched as a result of the appropriate placement of three simultaneously appearing openings 24 in channels 20, 21 and 22. When, and only when, all three apertures 24 are present, will the three individual photocells 44 be illuminated, resulting in turn-on of each of the transistors 42 and turn-off of the respective transistors 43. When this does occur, then, and only then, will the three lines 55, 57 and 59 simultaneously be at ground. When all three are at ground, the transistor 68 is biased off as a result of the grounded emitter. When transistor 68 turns off, a transistor 72 is allowed to turn on, as a result of the removal of the shunt circuit established by transistor 68 across the emitter to base of the transistor 72. The turn-on circuit to transistor 72 is established from the common lead 68*a* through the base to emitter circuit of transistor 72, a base resistor 73 and the resistor 69 and the normally on disable transistor 71. Transistor 72 conducts and supplies power via a resistor 74 to the base of a transistor 75 which turns on and interconnects a common line 76 from the negative D.C. line 36 to an output lead or mode selection lead 77. Each of the other channels of the decoder 29 provide a corresponding output line which is similarly uniquely connected to the negative line 36. The respective output lines are identified by numbers 78 through 85, inclusive, and with output line 77, constitute and are connected as one group of lines of a diode switch matrix 86**.

The diode switch matrix 86 provides controlled interconnection of each of the mode selection lines 77 through 85, inclusive, to a set of control lines through selective connection and placement of diodes 87.

In a highly practical construction, the mode selection lines 77 through 85 are formed on a suitable insulating base 87*a* as a plurality of parallel spaced conductors, as diagrammatically shown in FIG. 7. A plurality of output or control lines, hereinafter more fully described, are formed on the opposite side of the base as parallel conductors extending perpendicularly to the mode selection lines 77–85 and in overlying relationship. Openings at the point of intersection permit insertion of a plug-type diode 87 to establish a corresponding connection, as illustrated in FIG. 6. This is a known and convenient means for varying the connection within a diode matrix and in the present invention permits variations in the operating modes.

The control lines of the diode matrix 86 are connected in the master control circuit 31 which is shown in FIG. 6 and partially in the lower portion of FIG. 5 as a relay circuit establishing different controlled operation of the projection and tape drive motors 4 and 11 in accordance with the particular line 77–85 which is energized. The several modes heretofore generally described are illustrated and described as follows.

Mode 1: (Visual Information Mode)

In the first mode of operation, line 84, shown to the right in FIG. 6, is connected by a diode 87 to a single output or control line 88 of the diode matrix 86 at point L–81 and establishes a semi-automatic drive circuit with a visual presentation only. The negative potential on the line 88 is connected through a steering diode 89 to one side of a manually operable "Go" switch 90 at line L–85. The switch 90 is provided with an external push button 91, as shown in FIG. 1, and the opposite side thereof is connected in series to a semi-automatic control relay 92, the opposite side of which is connected to the positive D.C. lead or line 35 through a number of series connected contacts, as hereinafter described, and a manually operable tape stop switch 93. The go-start button 91 may be provided with an illuminating light 94 (L–84) connected in parallel with the "Go" switch 90 and relay 92 such that it is energized upon application of negative potential on line 88. When the switch 90 is closed, the relay 92 is energized and establishes a series of circuit functions, the first of which is to initiate energization of the projection film motor 4 as follows.

The relay controls a first set of normally open contacts 92–1 connected in line L–56. The normally open contacts 92–1 are connected in series with a set of normally closed contacts 95–1 of a stepping control and interlock relay 95, a set of normally closed contacts of another relay more fully described hereinafter, and the projection motor control relay 96. Thus, when the relay contacts 92–1 close, they energize the relay 96 which operates to pull in a number of contacts. A first set of contacts 96–1 (L–57) are connected in parallel with the contacts 92–1 and provide a first latch circuit for relay 96 through the interlock relay contacts 95–1. The relay 96 controls a second set of normally open contacts 96–2 in line L–2 of FIG. 4 which are connected in series directly with the projector motor 4 across the A.C. input power such that the projector motor 4 operates to move the film 3. Movement is terminated automatically after the film has moved precisely one frame through the operation of a film actuated limit switch 97 shown in line L–59 of FIG. 5 in series with the interlock relay 95. The limit switch 97 is held open with the film frame 13 aligned for presentation through the viewing opening 2. As soon as the film moves from such alignment, the switch 97 closes, providing power to the relay 95. When the relay 95 is energized, it opens the set of contacts 95–1 in line L–56, breaking the original latching circuit to the relay 96. The relay 96, however, is maintained energized through an alternative latch circuit, including the switch 97. Thus, a diode 98 interconnects the line L–56 to the line L–59 between the switch 97 and the relay 95 and closing of switch 97 provides an alternate path to maintain the relay 96 energized.

The relay 95 controls a second set of normally open contacts 95–2 (L–53) which interconnects the relay 95 directly to the negative power line in series with a second side of a manually operable switch 100 in line 58. Switch 100 is ganged to the "Go" switch 90 (L–85) to require release of switch 90 before a second film step is established. Thus, the film advance circuit is generally interlocked to require sequential depression and a subsequent release of the push button before the next step of the film can be obtained as a result of the parallel contacts and interlock with relay 95. In addition, a diode 101 connects the contacts 95–2 in series with the contacts 96–1. Thus, as long as the limit switch 97 is closed, both relays 95 and 96 are energized. When the limit switch 97 opens, the circuit to relay 96 and 95 opens in sequence and the circuit resets. Power contacts 96–2 in line L–2 of FIG. 4 open and the projector motor 4 is de-energized with a corresponding positioning of the next film frame 13.

The projector advance relay 96 further includes resetting contacts 96–4 and 96–5 at L–74 interconnected to reset the decoder 29. Referring particularly to FIG. 6, the contacts 96–4 are normally closed contacts connected between the base of the disable transistor 71 and the ground line 68*a* to the diode decoder networks 62 of decoder 29. With the contacts closed, power is supplied to maintain the transistor in the normal conducting state. When the contacts 96–3 open, the ground potential is removed and transistor 71 turns off. A Zener diode 71*a* is connected in the base circuit and a timing capacitor 71*b* is connected between the Zener diode and the emitter. When the base is reconnected to line 68*a* the capacitor 71*b* is charged to the firing level of the Zener 71*a* before the transistor 71 again conducts. The contacts 96–4 are normally open contacts and are connected directly across the capacitor 71*b* to discharge the capacitor and reset the timing capacitor. This opens the output circuit of the transistor 68 and the input circuit of the transistor 72 of the several decoder channels thereby resetting the circuit and removing power from the then conducting transistor 75. This in turn removes the power from the mode selection line 84 and resets the circuit to the master relay circuit therethrough.

The second frame presents the desired information viewing opening and aligns a new code carrier portion 14 with the decoder 29. It may maintain the original mode of operation which would require subsequent operation of the "Go" button 90, or may provide a subsequent mode of operation establishing an automatic drive and/or subsequent semi-automatic operation requiring actuation of the "Go" switch 90.

Mode 2: (Audio Information Mode)

The second mode selection line 83 is connected as follows to provide for visual display and associated sound information. The code film channels 20–22 provide a proper signal to turn on the transistor 42 (L–35) of channel 40 while maintaining the other two channels 39 and 41 in their initial condition. This establishes a binary 0 at each of the corresponding diodes (L–64) for the second channel. The transistor 75 associated with the line 83 turns on and provides power to the associated matrix 86. In the illustrated embodiment of the invention, in this position, diodes 87 interconnect the selection line 83 to the line 88 for visual display control as in the first mode and to a control line 102 (L–77) for the audio unit 25.

The line 102 supplies negative power to a pair of interrelated relays, including a relay 103 in line L–88 and a relay 104 in line L–101 to control tape motor 11. The tape drive motor 11 is connected in line L–7 of FIG. 4 with one side connected directly to one side of the power supply 32 and the other side connected to the opposite side of the power lines through a pair of back-to-back silicon controlled rectifiers 105 (L–8 and L–9). The gate circuits of the rectifiers 105 are interconnected to the power lines through a plurality of parallel connected contacts, including the normally open contacts 104–1 in line L–9 of the relay 104.

The relay 104 further controls a set of normally open latching contacts 104–2 in line L–104. The closing of contacts 104–2 completes a circuit to a set of normally closed contacts 96–3 (L–96) of relay 96 to a connecting line 106 which is connected to the audio unit 25, as shown in FIG. 4, and establishes a latch circuit under the control of the audio unit.

The relay 103, as previously noted, is energized in this particular mode of operation. As the action is not significant to this mode of operation, but rather other modes involving presentation questions and receiving of related answers, it is more fully described in connection therewith.

The audio unit 25 is therefore driven in accordance with the continued energization of the relay 104 through audio signal 106.

A relay 107 (L–100) is connected in series with a diode 108 directly to the negative power line 102 from diode matrix 86 and to the positive power lead 35. A capacitor 109 is connected in parallel with the relay 107 and slightly delays the operation of the relay 107. The relay 107 controls a first set of normally closed contacts 107–1 (L–101) which are connected in series with a diode 110 between the negative power line 102 of the diode matrix and the relay 104. The diodes 108 and 110, as well as similar other diodes described hereinafter, provide polarity steering and prevent feedback between the several circuits. After the time delay the relay 107 is energized to open the contacts 107–1 and thereby open the original energizing circuit to the relay 104. The relay 104 is now under the sole control of the latching circuit, including the contacts 104–2 (L–104) and the associated connection via line 106 to the audio unit 25 of FIG. 4.

The audio unit 25 employed in the illustrated embodiment of the invention is a four-channel unit having an audio amplifier 111 interconnecting three channel heads 112, 113 and 114 selectively into the system of the speaker through related relay contacts, as more fully developed hereinafter. The first head 112 related to the first channel is connected to the speaker through a set of normally closed contacts 104–3 (L–25) to any suitable control circuitry, that being diagrammatically illustrated showing the contact connected between the channel and ground. When the contacts 104–3 open, the readout is released to transmit the signal picked up by head 112 from an endless tape 115 to the speaker 19.

In addition to the three audio channels, the four-channel system includes a fourth control channel interconnected to a control head 116. The control tape 115 is formed with two different control signals, which are conveniently distinguished by the frequency of the signals. Thus, a 150 Hertz signal and a 1,000 Hertz signal have been employed. The output of the head 116 impresses the signal to a filter network 117 which separates and directs the respective low and high frequency signals to a tape control transistor switch 118 or to a projection advance control switch 119.

In a preferred construction, the switch means respond to the trailing edge of the beep signal such that the tape machine does stop with the beep signal on the tape aligned with control head 116. Thus, the respective circuits may be conditioned by the establishment of the related frequency signal and actually switched to produce an output at the signal lead only upon the trailing edge of the beep signal.

Each of the switch units 118 and 119 may be a transistor having its input circuit interconnected to the output of the corresponding filter network and the output interconnecting the negative D.C. supply line 36 to the corresponding output side of the switch unit. The switch unit 118 would be a normally conducting transistor to maintain the line 106 at a negative potential and thereby apply a complete latching circuit via the line 106 to the relay 104 of FIG. 6, line L–101, as previously described, includes the latching contact 104–2 in line L–104 such that the latch circuit remains open.

The audio switch unit 119 is connected via a control signal line 120 to the junction of the normally open contact 92–1 and the normally closed contact 95–1 in lines L–55 and L–56 of FIG. 5 for controlling of the relay 96. The switch unit 119 is normally off. A beep signal of a selected frequency is passed through the filter network to turn on switch unit 119 and thus provide negative potential at line 120 which is applied directly to the one side of the normally closed contact 95–1 (L–56) and thereby, in essence, in parallel with the contact 92–1 to provide for audio controlled operation of the projection motor 4 (L–6).

For example, in actual practice, beep frequencies of 1,000 Hertz and 150 Hertz have been employed to control switching units, the 150 Hertz signal controlled the switch at 118 and the 1,000 Hertz unit controlled the switch unit 119.

With the circuit latched in as described to this point, the switch or transfer may be established in two alternative modes, depending upon the signal recorded of the fourth channel of the tape 115. If the 150 Hertz signal is established, the latching circuit to relay 104 is broken. This in turn opens the associated contacts 104–1 of line L–9 and de-energizes the tape motor 11. The device will then maintain that condition with the tape motor stopped and the projector motor stopped until such time as the "Go" switch 90 (L–85) is actuated. Upon actuation of the "Go" switch 90, the projector motor 4 is energized through the circuit similar to that described for the first mode, as a result of interconnecting diode 87 which connects matrix control line 88 (L–81) to the second mode line 83. Thus, closing of the switch 90 energizes relay 92 in line L–85, which in turn closes the contacts 92–1 in line L–55. This energizes the relay 96 through the interlock action with respect to the relay 95 and provides for stepped movement of the film projector.

The second frame presents the desired information viewing opening and aligns a new code carrier position 14 with the decoder 29. It may maintain the original mode of operation which would require subsequent operation of the "Go" button 90, or may provide a subsequent mode of operation establishing an automatic drive and/or subsequent semi-automatic operation requiring actuation of the "Go" switch 90.

In either mode, the next presentation of the frame is established through energization of the relay 96, which in addition to driving the projector motor, as previously described, also actuates the relay contacts 96–4 and 96–5 to reset the decoder.

Mode 3: (Visual Questions and Answer Mode)

The third mode of operation includes a question-and-answer type of operation wherein a selected question 5 is submitted requiring selection of one of the five possible answers by operation of one of the push button units 7 on the front of the panel. In the illustrated embodiment of the invention, this is established by providing channel 21 with an aperture and channels 20 and 22 with continuous black light interrupting condition. This results in switching of channel 40 (L–36) of the reader with a binary 0 appearing at line 57. Lines 56 and 60, which are connected to normally conducting transistors 43 of channel 39 (L–37) and 40 (L–33), also have a binary 0. Consequently, all three inputs to the diode network 62 of decoder 29 in FIG. 6 are at a binary 0 and the channel switches to turn on the associated transistor 75 connected to line 82 and applies a negative potential thereto. Line 82 is connected by the associated diode 87 to an answer insertion line 121 (L–76) and supplies negative potential to the master circuit to insert the question-and-answer response unit 28 of FIG. 5 into the circuit. The answer-response schematic diagram is shown in FIG. 5 with the incoming negative potential line 102 shown at lines L–45.

The question-and-answer response unit 28 generally corresponds to the control circuit shown in applicant's copending application entitled INSTRUCTIONAL DEVICE which was filed on Nov. 19, 1968 with Ser. Number 776,988. The several push button actuated switches 8 associated with the push button units 7 on the outer of the housing selectively and individually control a related transistor switching circuit. Each of the switches 8 is a single-pole, double-throw switch having a common pole 122 selectively engaging a control contact 123 and an interlock contact 124. The control contacts 123 are connected to a sensing transistor 125 shown as a PNP type, the base of which is connected to the junction of a photocell 126 and a resistor 127. The photocell 126 forms a control signal source means with the carrier channels of the film and is connected to the incoming line 121 of the diode matrix 86 and the opposite end of the resistor 127 is connected to ground. The emitter of transistor 125 is also connected to ground. The photocells 126 are positioned to selectively respond to the answer control channels 15–19 of the film 3, as shown in FIG. 2. If an aperture 24 is provided in the channel, it illuminates the corresponding photocell 126 and conditions the corresponding switch 8 to be actuated to select the correct answer. Thus, with the photocell 126 illuminated, the resistance thereof decreases and completes a turn-on between the base to emitter of the transistor which effectively grounds the collector and the interconnected contact 123. If the proper switch 8 is actuated, the ground potential is applied to the base of a transfer transistor 128 (L–39), the emitter of which is connected to the line 121. Transistor 128 which is an NPN type conducts and provides an output current through a set of normally closed contacts 103–1 (L–44) of relay 103 which is connected in the master control circuit 31 of FIG. 6 at line L–88 and completes the circuit through a correct answer relay 129 to the positive power control lead 35 in FIG. 5.

Relay 129 closes and opens a plurality of associated contacts. The first set of contacts 129–1 (L–45) interconnects the negative potential line 121 to the relay 129. A correct answer lamp 130 (L–37) in series with a diode 131 is shown connected between the contact 123 and contacts 129–1 to energize the lamp 130 and provide an indication of the selection of the correct answer.

Additionally, a set of relay contacts 129–2 in line L–22 close and interconnect a suitable section of the audio amplifier 111 to the negative line 36 to actuate an audible source 132 and produce a correct answer related signal. In this particular mode, a feedback signal lead 133 (L–44) connects the correct answer circuit to the master control circuitry and in particular the circuit of the "Go" switch 90 (L–85) of FIG. 6 in series with a diode 134. This establishes a circuit for subsequent, semi-automatic operation under the control of the switch 90.

If an incorrect answer is selected, the corresponding switch 8 engages the contact 123. The associated transistor 125, however, is maintained off, as a result of the high resistance of the related photocell 126 and consequently transistor 128 remains off.

Each of the switches 8 includes additional ganged switches 135 and 136 (L–46–52) coupled to the corresponding poles 122 for simultaneous operation therewith and connected to actuate a wrong answer circuit. Switches 136 connect the negative line 121 in series to a wrong answer relay 137 (L–51). The several switches 135 similarly energize individual wrong answer lamps 138. The several switches 135 and 136 are connected in common to the negative line 121 (L–45) through a set of normally closed contacts 129–3 of the correct answer relay 129 and normally closed contacts 103–2 of the interlock relay 103 for purposes more fully described hereinafter. A wrong answer is therefore indicated by illumination of a corresponding lamp 138 and energization of the relay 137. Energization of relay 137 opens a set of normally closed contacts 137–1 in line L–21 of FIG. 4 and interconnects the audible circuit 132 to produce a wrong answer related audible signal. Energization of relay 137 also provides actuation of other contacts within the master control circuit which are employed in other modes of operation as presently described.

In the present mode, any number of incorrect answers can be selected until the correct answer is selected. When the correct answer is selected, and only when the correct answer is selected, the "Go" circuit of line L–85 is conditioned for subsequent semi-automatic operation by switch 90. In this mode of operation it will be noted that the audio unit 26 is not interconnected or actuated other than to provide an alarm related to a correct or incorrect answer. Thus, the tape motor 11 is held inactive and no signal is transmitted via the audio heads 112, 113, 114 or the control head 116.

When the operator actuates the "Go" switch 90, the projection motor 4 is energized to move a single frame as a result of the energization of relay 92 in line 85 and the sequential energization of relays 96 and 95 in lines L–56 and L–59, as previously described.

Mode 4: Visual Question and Answer Mode with One Channel of Audio)

The next mode illustrated is established at selection line 81 of the decoding circuit 29. Line 81 is connected by three diodes 87 respectively to lines 121 (L–76), 102 (L–77) and an output line 139 (L–79) of the diode matrix 86 in response to a corresponding code input appearing at lines 56, 57 and 59 of the code reader 27. In this particular mode of operation, the question-and-answer circuit is established via the matrix control line 121 generally in accordance with the previous description of the immediately preceding mode. Similarly, the line 102 provides negative power to the circuit of the relay 103 in line L–88 and to the audio control relay 104 in line L–101.

The line 139 is connected to provide an additional power supply to the circuits of the relay 104 through a set of normally open contacts 129–4 (L–102) of the correct answer relay 129 (L–44).

The application of power via lead 102 to the relay 104 results in the energization thereof in the same manner as previously discussed with respect to the second operating mode. Thus, in the sequence, relay 104 energizes the contacts 104–3 in line L–25 to insert channel 1 of the audio amplifier into the circuit. It simultaneously actuates contacts 104–1 in line L–9 to energize the tape motor and transport the tape 115 such that any message presented in channel 1 is transmitted over the loud speaker 9 of the unit. Relay 104 is latched into circuit through the associated relay contact 104–2 in line L–104 and the audio signal line 106 to the switch unit 118, shown in FIG. 4.

In this mode, the relay 103 is energized upon the energization of the relay 104 through the circuit appearing at line L–88. Thus, the positive side of the power supply is connected through the now closed contacts 104–4 to the relay 103, the closed contacts 107–2 of the relay 107, and a diode 140 to the line 102. Energization of the relay 103 closes a set of latching contacts 103–3 connected to by-pass the relay contacts 107–2 and maintain the relay 103 energized as long as the relay 104 is energized to hold the contacts 104–4 closed. As previously noted, the relay 107 is energized after a slight time delay as a result of the capacitor 109 to open the contacts 107–1 in the circuit of relay 104 and also to open the contacts 107–2 in the circuit of the relay 103 just described. The relay 104, however, is maintained energized through the latch circuit which is controlled by the audio switch unit 118.

As previously noted, energization of the relay 103 actuates the normally closed contacts 103–1 and 103–2 in the question-and-answer response circuit and particularly lines L–44 and L–46. Thus, the energization of the relay 103 effectively de-energizes the answer selection circuit. During this initial period, a message is transmitted via the channel head 112. At the end of a desired message, a proper 150 Hertz signal in the assumed example is applied to the control head 116 and fed to actuate the switch unit 118 to remove the negative power from the line 106. This line breaks the latch circuit to the relay 104 which resets opening its self-latching contacts 104–2 and also the latching contacts 104–4 for the relay 103. The deenergization of these two relays stops the tape motor 11 and through the closing of contacts 103–1 and 103–2, inserts the answer response unit 28. The operator now selects a desired answer in the same manner as previously described in the previous mode of operation. An incorrect response operates the system in the same manner as the previous mode. When a correct response is obtained, the transistor 128 conducts and supplies power to energize the correct answer relay 129. In addition to providing the correct answer response, as previously described, the energization of relay 129 closes to normally open contact 129–4 in line L–102. Negative potential line 139 of matrix 86 is connected to supply the negative potential as a result of its connection to the mode selection line 81 of matrix 86. Once energized, relay 104 is energized and closes latch contacts 104–2 to establish a maintaining circuit through the line 106 from switch unit 118 of the audio unit in FIG. 4.

In this mode, the energization of relay 129 also closes a set of contacts 129–5 in line L–102 and provides energization of a first-try relay 141 through a set of normally closed contacts 95-3 of interlock relay 95 (L–59) and contacts 104–4 of relay 104 (L–101). Energization of relay 141 first results in closing of a set of normally open latch contacts 141–1 to maintain the relay 141 energized through the normally closed contacts 95-3. The relay 141 also opens a set of contacts 141–2 in the negative potential line 139 of matrix 86, as shown at line L–78, and thereby removes the negative potential from the input side of the contacts 129–4 in line L–102 for energizing relay 104 therethrough. Consequently, relay 104 is only maintained through its latch circuit as previously described. The tape motor 11 is again energized with the first channel head 112 interconnected to transmit any desired message. The audio unit 25 will then proceed to either give a message, if present, followed by a command signal applied via the control channel to the control head 116. The control signal produces an automatic projector advance, or a tape stop signal requiring a subsequent semiautomatic control through the "Go" switch 90 with a resulting stepped movement of a film frame 13 to present the next succeeding frame and the next succeeding control channel.

Mode 5: Visual Question and Answer Mode With Two Channels of Audio)

This channel actuates the decoder 29 to energize the mode selection line 80. This establishes the same three circuits just described in Mode 4, and in addition, interconnects the line 80 through a diode 87 to a second audio channel selection line 142 (L–79) and thus establishes a negative potential on the four control lines 121, 102, 139 and 142 of matrix 86.

In the illustrated embodiment of the invention, a diode 142*a* connects lines 139 and 142 rather than having a diode 87 connecting line 139 to line 80. The circuit operation is essentially the same except power to line 139 is now derived from line 142. The circuit operates in the same manner as previously described up to the point of insertion of the answer circuit as a result of the sequential energization of relay 103 in line L–88 and the related opening and subsequent closing of the contacts 103–1 and 103–2 in lines L–44 and L–46, respectively. If a correct answer is immediately selected, the procedure also corresponds to the procedure set forth with respect to the immediately preceding mode which involves the use of a single audio channel. If a wrong answer is selected in this mode of operation, the wrong answer relay 137 is energized with a resulting opening of the contacts 137–1 in line L–21 to produce a corresponding signal. In addition, the relay 137 closes a related set of contacts 137–2 in line L–98 of FIG. 6. These contacts close and complete a circuit from the matrix output line 142, which is now energized, to a second channel relay 143 in line L–97 to the positive power line. The second channel relay 143 controls a first set of contacts 143–1 in the tape motor circuit at line L–8 and results in the energization of the tape motor 11 and the movement of the sound tape 115. The relay 143 (L–97) controls a set of normally closed contacts 143–2 in line L–24, the opening of which connects the second channel head 113 to the speaker to transmit the message in the second channel to the operator. Normally, this message will be related to the wrong answer selected.

In addition, the relay 143 closes a set of latched contacts 143–3 in line L–99 and connects the relay 143 to the audio signal line 106 via the closed contacts 96–3. This latches the relay 143 into an operating circuit controlled by the switch unit 118 of the audio switching control channel and particularly the head 116 of FIG. 4.

The relay 107 (L–100) energizes a fourth set of contacts 143–4 (L–87) which connect the positive side of the power supply to the relay contacts 137–4 (L–93) of the wrong answer relay. The contacts 137–4 provide power to the right side of the relay 141, the left side being connected through the contact 95–3 to the negative supply line. Thus, relay 141 is energized and closes its associated contact 141–1 to establish and maintain the relay energized under the control of the projection interlock or stepping relay 95.

Energization of the relay 141 opens the contacts 141–2 in line L–78 and a third set of contacts 141–3 at line L–79 to simultaneously break the negative supply from the matrix output lines 139 and 142 to the corresponding circuits for relays 104 and 143. The tape motor 11 is now energized through the action of the relay 143 (L–97) which is latched in through the audio control signal line 106 (L–96). The message is transmitted and the circuit proceeds with a signal established on the tape and transmitted via the head 116 to either the switch unit 118 or 119, to provide, respectively, a tape stop signal at line 106 or a projection advance signal at line 120. The latter automatically actuates the relay 96 at line L–56 to proceed to the next film frame 13.

If a tape stop signal appears at line 106, the latch circuit to the relay 143 (L–97) is broken and the tape motor circuit is de-energized. The answer response circuit 28 remains energized and the operator can then proceed to push the buttons 7 until the correct answer is obtained, in the same manner as previously described. When the correct answer is obtained, the relay 129 is energized to indicate the obtaining thereof and simultaneously a signal is transmitted via the line 133 to the "-Go" circuit switch 90 (L–85) such that the operator can proceed to the next frame by closing of the switch 90, in the same manner as heretofore discussed.

Mode 6: Visual Question and Answer Mode with Three Channels of Audio)

Another mode of operation is obtained with the present invention by energizing of the mode selection line 79 of the selection circuit of decoder 29. The line 79 is coupled through the diodes 87 to energize the answer circuit line 121, the first audio channel line 102 and a third audio channel output line 144 of matrix 86. In this particular mode, the sequence is essentially the same as that previously described in the two previous modes up to the point of the insertion of the answer circuit. Thus, the matrix line 102 inserts the first audio channel and provides a given message with a subsequent tape stop control through the relay 104 (L–101). Relay 103 is energized in response to operation of the audio channel select relay 104 and opens a set of contacts 103–5 in the matrix control line 144. When the tape stops, the relay contacts 104–4 in line L–88 open to insert the answer response circuit.

In this particular mode of operation, the question presented has a correct answer in only one of the channels associated with three of the push button switches, assumed those associated with push buttons 7 marked A, B and C. The corresponding three push button switches 8 have one additional switch ganged thereto and interconnected into the master control circuit 31, including a switch 145 at line L–103, a switch 146 at line L–97 and a switch 147 at line L–95. The input side of each of these switches are connected to the matrix output line 144. If the push buttons D and E of FIG. 1 are actuated, the wrong answer relay 137 is energized, a procedure similar to that previously described immediately above.

If the push buttons A, B or C are actuated and the associated switches closed, the answer might be right or wrong. In any event, whichever switch is actuated, the corresponding contacts or switch 145, 146 or 147 is energized. These switches are respectively connected to supply negative power to the first audio channel relay 104 (L–101), the second audio channel relay 143 (L–97), and a third audio channel relay 148 (L–95). The operation of relays 104 and 143 provides a similar interlocking action, as previously described with the respective relays being latched into the circuit through the audio control signal line 106 to maintain operation under the control of the control signal head 116.

The third audio channel relay 148 (L–95) similarly includes a set of latching contacts 148–1 which interconnect the relay directly to the normally closed contacts 96–3 in line 106. Relay 148 also controls a set of normally open contacts 148–2 (L–7) in the gate circuit for the tape motor 11, and a third set of contacts 148–3 (L–23) in the audio amplifier 111. Thus, when the relay 148 is energized, it will open the contact 148–3 and interconnect the third channel head 114 to the speaker 9 to transmit the message carried thereby to the speaker.

The relay 148 includes a fourth set of contacts 148–4 (L–86) which are normally open contacts and which are connected into the circuit to control the energization of the relays 106 and 141, generally in the manner heretofore described, with respect to first and second channel relays 104 (L–101) and relay 143 (L–97).

In this particular three-channel mode of operation, if the push buttons 7 A, B or C are actuated, either correct answer relay 129 or the wrong answer relay 137, depending upon whether or not the selection is correct or incorrect, with a closing of contacts 129–5 or 137–4 to energize relay 141 (L–92). The relay 141 controls a further set of contacts 141–4 at line L–80 which are connected in the output matrix line 144. Thus, with either the correct or incorrect selection, the negative power supply is removed from the input side of the switches 145, 146 and 147. As a result, the corresponding tape motor drive circuit is now solely responsive to the output of the switch unit 118 as it appears at line 106. The device then follows the procedures previously described, responding either to a tape motor stop signal at line 106, requiring subsequent actuation of the "Go" switch 90, or an automatic advance as a result of a signal appearing at line 120 which directly applies an energizing signal to the relay 96 at line L–56.

In the illustrated embodiment of the invention, the line 78 of the decoding circuit in the input of the diode matrix switching circuit is not connected into the output circuit and, in essence, constitutes a spare circuit which can be interconnected, if desired, to provide still a further mode of operation not disclosed herein.

Mode 7: (External Control Mode)

The next illustrated output mode selection line 77 is connected into the circuit to provide an external operating mode wherein the negative power supply is connected through the decoder to lines 102, 88 and an external control line 149. The energization of lines 102 and 88 provides the same sequence of operations as that established in the second mode, wherein the line 77 is energized and supplies negative power to the corresponding lines 102 and 88. In addition, the line 149, which has negative power supplied thereto, is connected into circuit to control an external control relay 150, illustrated at line L–90. The one side of the relay 150 is connected in series with a diode 151 to the line 149. The opposite side is connected to the positive supply line. The relay 150 normally opens contacts 151–1 in line L–3 of FIG. 4 and when energized, provides power to external jacks 152 and 153. This permits interrelated power and operation to an external reinforcing device such as a slide and movie projector.

As a result of the application of power to line 102, the tape motor 11 and the first audio channel head 112 are simultaneously connected for corresponding timed operation through the operation of the first audio channel relay 104 at line L–101. The sequence is that of the several similar previous descriptions of the sequential relay energization. Relay 104 is now controlled through the control signal line 106 and consequently the operation of the system is responsive to a stop signal at line 106 or a projection advance signal at line 120 in FIG. 4. The projection advance signal results in a related de-energizing of the relay 104 and a corresponding de-energization of the relay 150 as a result of the opening of the contacts 104–4 at line L–88. The stop signal results in a related de-energization of relay 104 only. Thus, if a tape stop signal is obtained, the system stops but the external device continues to be energized and requires a previously described, semi-automatic operation through the operation of the "Go" switch 90 in line L–85. The automatic unit, of course, is established by the signal lines 120 which automatically actuates the relay 96, resetting the several circuits and advancing the film one frame.

Mode 8: (Selective Audio Information Mode)

The final mode of operation in the illustrated embodiment of the invention is established by the final output matrix line 85 which is connected directly into the circuit through a manually operated switch 153 (L–75) which is connected between the line 85 and the negative D.C. supply line 36 in FIG. 6. The line 85 is connected by diodes 87 to the lines 88 and 144 to provide negative potential to the corresponding lines. The switch 153 is ganged with a second switch 154 (L–41) interconnected between the ground line 46 to the reader 29 and the answer selection circuit 28 and the ground line in FIG. 5. This disables circuits 28 and 29. Line 88 supplies power through the diode 89 to the "Go" switch 90 (L–85) to permit manual stepping of the projection unit 26.

Line 144 provides power to the switch 145 (L–103), switch 146 (L–97) and switch 147 (L–95). These are connected to answer switches 8 for the A, B and C push buttons 7 for operation even though the answer circuit is disabled.

Thus, the operator may, by selecting the proper push button 7, actuate the corresponding related switch 145, 146 or 147 and in turn, establish the energization of the first audio channel relay 104, the second audio channel relay 143, or the third audio channel three relay 148. The tape motor 11 is thereby energized with one audio channel interconnected to the speaker 9. The control is under the signal from the head 116 of the audio unit 25 and responds to either a tape stop signal at line 106, or a projection advance signal at line 120, as previously described.

MANUAL CONTROL

In addition, the circuit may provide various manual advance controls for either the projector film 3, the audio tape 115, or both, for purposes of synchronization or for any other desired purpose.

Thus, in the illustrated embodiment of the invention, a program adjust switch 155 is provided in line L–107 and a related interconnected or ganged switch 156 is provided in line L–5 of FIG. 3. The switch 156 is connected in series with a rapid advance switch 157 directly to the projector motor 4. Thus, the projector motor 4 is energized until the switch 157 is released.

A single step switch 158 is provided in line L–56. The switch 158 directly connects the relay 96 to the negative supply or control line 36 through the normally closed interlocking relay contact 95–1 to provide the single step advance in response to a momentary energization of contacts 158, similar to the closing of contacts 92–1.

Further, as previously noted, the program adjust switch unit includes the switch 155 in line L–107. This is connected in series with a momentarily and/or manually actuated switch 159 at line L–106 and directly applies a negative potential to the one side of the relay 104 for the first audio channel relay 104 in line L–101. This results in the energization and the self-latching of relay 104 and operation of the tape motor circuit through the control of the switch unit 118. The tape motor 11 stops in response to either a tape or a projector signal appearing at the respective lines 106 and 120 of the audio unit 25 connection in FIG. 3. The circuit for these relays, as previously described, is through the stop tape switch 93 in line L–85 and consequently the circuit can be broken at any time to terminate the drive of the motor 11 by momentarily opening of this switch and thereby resetting the relay 104.

A further manual tape adjust switch 160 is connected to the negative supply line 36 at line L–105 of FIG. 6 and in series with a fixed set of contacts 92–5 to the negative potential side of the relay 104. This provides a controlled energization of the relay 104 from the "Go" relay 92 in line L–85. To limit the control to this circuit, a switch 161 in line L–55 is provided to open the circuit for the normal control contacts 92–1 of the "-Go" relay 92. Thus, with the code carrier on the film 3 providing a signal to supply power to the "Go" switch 90 in line L–85, the relay 92 may be energized to close the contacts 92–5 in line L–105. This provides energization of the first audio channel control relay 104 which establishes itself to drive the tape motor 11 but does not result in energization of the relay 96, as a result of the opening of switch 161. The relay 104 opens the circuit to the relay 92 through the associated normally closed contacts 104–5 provided therein. The circuit is then under the control of the tape motor control head 116 and/or the stop tape switch 93 in line L–85.

The tape position can be further controlled through the program adjust switch 155 in line L–107 and a homing relay 162, which is connected in circuit therewith through a manually operated push button home switch 163. A transistor switch 164 is connected in series with a set of latching contacts 162–1 of relay 160 to provide a sustaining circuit in response to momentary closure of switch 163. The relay 162 also controls a set of normally closed contacts 162–2 in line L–56 to disable the projection advance relay 96.

The relay 162 includes a further set of normally open contacts in line L–10 which interconnect the gate circuit to the power supply and provide for energization of the tape motor 11.

The motor is thus operated to drive the tape 115 to the home or starting position, where it automatically provides a signal to turn off the transistor 164 and thereby open the latching circuit for relay 162, causing it to reset and terminate the drive sequence and simultaneously resetting of the circuit.

In the illustrated embodiment of the invention, the endless tape 115 is provided with a metallic sensor 165. The tape moves between a pair of sensing contacts 166 which are connected across the base to emitter circuit of the transistor 164. Consequently, when the foil moves between the contacts 166, it directly shorts the base to emitter resulting in the turn-off of transistor 164 and the resetting of the circuit of relay 162 as just described.

Thus, the present invention provides a multiple mode operating instructional device which can be readily and conveniently adapted to a wide variety of interrelated methods of presenting information from two or more information carriers.

We claim:

1. In instruction device for presenting stimulus information to the operator thereof from visual and audio media having respective first and second selective multiple control signal means, the combination comprising:

a. first and second drives for said respective visual media and audio media, b. first and second presentation means for respectively presenting visual information to the operator from said visual media and audio information to the operator from said audio media, c. circuit means selectively responsive to said first multiple control signal means to actuate said second drive and second presentation means, d. and advancing means selectively responsive to said second multiple control signal means when said second drive is actuated to automatically actuate said first drive, said advancing means comprising;

1. a manually operable switch to initiate each cycle of operation, 2. and circuit means connecting said switch with said first drive, 3. said last-named circuit means being energized in response to said second multiple control signal means so that actuating said switch actuates said first drive.

2. The device of claim 1 which includes: stop means selectively responsive to said second multiple control signal means when said audio media is being driven to deactivate said second drive and second presentation means.

3. The device of claim 2 which includes: means operable simultaneously with said stop means and responsive to a selected second multiple control signal means to actuate said first drive means to thereby advance said visual media automatically as said audio media drive is de-activated.

4. In an instruction device for presenting stimulus information to the operator thereof from visual and audio media having respective first and second selective multiple control signal means, the combination comprising:

a. first and second drives for said respective visual media and audio media, b. first and second presentation means for respectively presenting visual information to the operator from said visual media and audio information to the operator from said audio media, c. circuit means selectively responsive to said first multiple control signal means to actuate said second drive and second presentation means, d. said visual media presenting a visual question with multiple responses, and said first control signal means for said visual media including a first series of multiple control signal means corresponding to said multiple responses, and a second series of multiple control signal means, e. response selection means corresponding in number to the multiple responses on said visual media, f. and register means for indicating the correctness of the response selected in accordance with said first series of control signal means, g. said circuit means being responsive to said second series of control signal means to actuate said second drive and second presentation means while said response selection means and register means are de-activated.

5. The device of claim 4:

a. which includes: stop means selectively responsive to said second multiple control signal means when said audio media is being driven to de-activate said second drive and second presentation means, b. and wherein said circuit means includes means to activate said response selection means and said register means when said stop means has operated.

6. The device of claim 4:

a. wherein said audio media contains a plurality of audio channels, b. and wherein said second presentation means is adapted to present audio information from a selected one of said channels, c. and wherein said circuit means is responsive to said response selection means to select the channel presented by said second presentation means.

7. The device of claim 6 wherein said audio media contains a plurality of audio channels which are less in number than the number of possible multiple responses in accordance with said first series of multiple control signal means.

8. The device of claim 6 wherein said audio media contains a plurality of audio channels which are equal in number to the number of possible multiple responses in accordance with said first series of multiple control signal means.

9. The device of claim 1:

a. having connection means for connection to an external presentation means, b. and wherein said device includes output means connected to said connection means for communication to the external presentation means, said output means being responsive to a selective first multiple output signal means.

10. In an instruction device for presenting stimulus information to the operator thereof from a first information carrier means and a second information carrier means, the combination comprising:

first and second drive means for said respective carrier means, first and second presentation means for respectively presenting information to the operator from said related carrier means, signal source means operated in synchronism with said presentation means and selectively establishing a multiple control signal means having a plurality of unique combinations, and decoding means having mode selection channels with logic signal lines connected to said signal means and selectively responsive to said unique combination of signal means, whereby each channel responds to a selected binary number input, each of said selection channels establishing a power lead, control leads selectively connected to combinations of said power leads and establishing corresponding power transfer therethrough and said control circuit means having terminals connected to said control leads for actuating of said first and second drive means in predetermined interrelated modes.

11. The instruction device of claim 10 wherein said signal source means includes a multiple channel code carrier having separate code portions, one for each bit of a multiple bit binary code, sensing means aligned one each with said portions to establish a plurality of unique binary number combinations at a plurality of code signal lines.

12. The instruction device of claim 10 wherein said first information carrier means is a multiple frame film and said second information carrier means is an explanatory sound record, said first presentation means being a film projector presenting said film frames in time spaced sequence and said second presentation means being a record player to play back said record, said signal source means including a code carrier on said film with separate portions for each of said film frames, said carrier having a multiple number of signal portions each including a code bit to establish said plurality of unique combinations, and said decoding means having a plurality of reading means aligned with the path of said carrier and responsive to said unique combination of signal means to selectively actuate a plurality of selection circuits and establish the connection of a control circuit means for actuating of said first and second drive means in a predetermined different interrelated mode for each of said plurality of unique combinations, and said record player having a film advance output connected to said first drive means and said control circuit means, sound record having a plurality of control signals for alternately actuating said film projector to move said film to a different film frame and actuating said control circuit means to stop the record player and the film projector and condition the control circuit means for manual selective response.

13. The instruction device of claim 12 wherein control circuit means includes a operating circuit for said first drive means and responsive to momentary input to move said film from one frame to another, said control circuit means having pulse responsive latch circuits for establishing operating circuits to said drive means, and said sound record establishing pulse control signals to actuate said operating circuit and said latch circuits.

14. The instruction device of claim 13 wherein said record player includes a pair of frequency sensitive switches connected respectively one each to said film projector drive means and to said latch circuits, said switches each being timed to a distinctly different frequency, and said sound record being provided with corresponding frequency signals.

15. The instruction device of claim 13 wherein said record player has a plurality of channels for presenting different sound information, and said control circuit means includes means to selectively couple said channels to a sound reproduction means and energize the drive means of the record player, said mode selection energizing said audio channel select means and including latch circuit means to maintain said audio channel select means energized, said latch circuit means including switch means actuated by said pulse control signals of said record player.

16. The instruction device of claim 10 wherein said first information carrier means establishes a visual display in the form of a multiple choice response, said second carrier means is a sound reproducing means, a manually actuated response selection means to establish a corresponding signal, and said signal source means actuating said control circuit means to selectively enable and disable said selection response means in timed relation to the operation of said sound reproducing means.

17. The instruction device of claim 16 wherein said sound reproducing means includes a plurality of channels, and said control circuit means is selectively connected to insert said channels in accordance with the operation of said response selection means.

18. The instructional device of claim 10 wherein said first presentation means includes a film projector for visual presentation of individual film frames in sequence, and said second presentation means includes a record player, a film releasably mounted in said projector with frames at least some of which carry a question and multiple choice answers and having an integral code area adjacent each frame and defining a code carrier, an operating circuit for said drive means of said projector to move the film from one frame to another, each of said code areas having a similar plurality of spaced code portions selectively opaque or light transmitting to define said unique combinations thereof related to a selected mode of operating said projector and said record player during the presentation of the corresponding film frame, a multiple channel code reader, said signal source means including photoelectric cells aligned with said selected code portions and connected to said code reader, each code channel of said code reader having a pair of alternately conducting transistors and a pair of signal lines correspondingly connected one to each of said transistors, a plurality of decoding means each having multiple input diodes with the diodes of each decoding means connected to one of said signal lines of each pair and each having a transistor switching circuit actuated by only one of said unique combinations to actuate an output transistor and connect an output lead to one side of a power supply, a switching circuit having a plurality of input conductors connected one each to each of said output leads of the decoding means and a plurality of control donductors selectively connected to each of said input conductors by steering diode means, said control conductors each being selectively connected to said control circuit means, said record player having three sound information channels and a control channel, said control channel establishing a film advance signal of a selected first frequency and a tape stop signal of a different second frequency, frequency sensitive switch means connected to said control channel and having a film advance output line and a tape stop output line, multiple choice answer related selection switches coupled to the second selected code portions of said film and correspondingly connected to actuate a correct answer relay and an incorrect answer relay, said switching circuit having means to selectively apply power to said selection switches, said control circuit means having a plurality of branch circuits connected to said control conductors and including individual sound channel selection relays connected to simultaneously activate the corresponding channel and energize the sound reproducing means, said sound selection relays having latching circuits connected to the tape stop output line of the record player, a semi-automatic film advance relay connected to activate said operating means for advancing said film, said film advance relay having an alternate circuit connected to correct answer relay to permit selected manual advance control in response to a correct answer solution, an answer selection interlock relay connected to disable said answer selection means, and a control circuit disconnect relay to disconnect the control circuit means from said control conductors, said individual sound selection relays including latch circuits connected in common to the tape stop output line of said sound reproducing means, and said correct answer relay and said incorrect answer relay including relays connected to and selectively operating said individual channel selection relays and said circuit disconnect relay of said control circuit means.

19. In an instruction device for presenting stimulus information to the operator thereof from a first information carrier means and a second information carrier means, the combination comprising:

first and second drive means for said respective carrier means, first and second presentation means for respectively presenting information to the operator from said related carrier means, signal source means operated in synchronism with said presentation means and selectively establishing a multiple control signal means having a plurality of unique combinations, and decoding means selectively responsive to said unique combination of signal means to establish the connection of a control circuit means for actuating of said first and second drive means in a predetermined interrelated mode, said first presentation means includes a film projector for visual presentation of individual film frames, and said second presentation means is a second reproducing means to present audible messages, a film releasably mounted in said projector and having an interconnected code carrier including corresponding portions for each frame, each of said portions having a similar plurality of code portions with code means carried thereby and defining said unique combinations related to a selected mode of operating said projector and said reproducing means during the presentation of the corresponding film frame, a multiple channel code reader, said signal source means including sensing means aligned with said code portions and connected to said code reader and having a plurality of signal lines with the energization of said signal lines related to the sensed code means, a plurality of decoding means connected in common to said signal means and each being actuated by only one of said unique combinations, and a switching circuit having a plurality of input conductors connected one each to each of said decoding means and a plurality of control conductors, said control conductors each being connected to said control circuit means to establish a selected actuation of said film projector and said reproducing means wherein the connection within said matrix establishes different operating modes in response to selective energizing of the input conductors.

20. The instructional device of claim 19 wherein : said sound reproducing means includes at least three sound information channels and a control channel, said control channel including film advance signals of a selected first frequency and a tape stop signal of a different second frequency, frequency sensitive switch means connected to said control channel and having film advance output line and a tape stop output line, a film advance control means having an input connected to said advance output line, said control circuit means having a plurality of branch circuits connected to said matrix control conductors and including individual sound channel section means connected to simultaneously activate the corresponding channel and energize the sound reproducing means, said sound channel selection means having latching circuits connected to said tape stop output line, and semi-automatic control means responsive to opening of said latching circuits to establish manually actuated advance means.

21. The instructional device of claim 20 having:

a multiple choice answer selection means being coupled to second selected code portions of said film and correspondingly establishing a correct answer output circuit and an incorrect answer output circuit, said correct answer output circuit including switching means connected to and selectively operating said semi-automatic control means for advancing of said film after operation of the control circuit means from said tape stop output line.

22. The instructional device of claim 19 wherein: said sound reproducing means includes a sound information channel and a control channel, said control channel including film advance signals of a selected first electrical characteristic and a tape stop signal of a different second electrical characteristic sensitive to said electrical characteristics and switch means connected to said control channel and having a film advance output line and a tape stop output line, a film advance means having a plurality of input means, one of which is connected to said advance output line, said control circuit means having a plurality of branch circuits connected to said control conductors and including sound channel selection means connected to simultaneously activate the corresponding channel and energize the sound reproducing means, said sound selection means including latch circuits connected in common to the tape stop output line of said sound reproducing means, and disable means connected to said film advance means and to said decoding means to operably disable the decoding means during the film advance operation.

23. The instructional device of claim 22 wherein said disable means includes a time delay after disable of said decoding means.

24. The instructional device of claim 19 wherein each of said decoding means includes a multiple diode logic input and a transistor switching circuit, each of said decoding means being response to corresponding biasing of each diode in the input to actuate the transistor circuit to connect a power lead to a source of power and thereby establish power to corresponding input conductor of said switching circuit to supply power to the connected control conductors.

25. The instructional device of claim 24 having a normally conducting transistor disable switch common to all of the transistor switching circuits, and means responsive to actuation of the film projector to actuate said transistor disable switch during the movement of said film.

26. In an instruction device for presenting stimulus information to the operator thereof from a first information carrier means and a second information carrier means, the combination comprising:

first and second drive means for said respective carrier means, first and second presentation means for respectively presenting information to the operator from said related carrier means, signal source means operated in synchronism with said presentation means and selectively establishing a multiple control signal means having a plurality of unique combinations, and decoding means delectively responsive to said unique combination of signal means to establish the connection of a control circuit means for actuating of said first and second drive means in a predetermined interrelated mode, said first presentation means includes a film projector for visual presentation of individual film frames in sequence, a film releasably mounted in said projector with frames at least some of which carry a question and multiple choice answers and having an interconnected integrally lateral edge area defining a code carrier including a corresponding code area for each frame, a film advance operating means for said drive means of said projector to move the film from one frame to another, each of said code areas having a similar plurality of spaced code portions having code means carried thereby and defining said unique combinations related to a selected mode of operating said projector and said record player during the presentation of the corresponding film frame, a multiple channel code reader, said signal source means including sensing means aligned with said selected code portions and connected to said code reader, each code channel of said code reader having a pair of alternately conducting signal lines with the energization of said signal lines related to the sensed code means, a plurality of decoding means each having a multiple input connected in common to one of said signal lines of each pair and each being actuated by only one of said unique combinations, a matrix switching circuit having a plurality of input conductors connected one each to each of said decoding means and a plurality of control conductors selectively connected to each of said input conductors by steering diode means, said control conductors each being connected to aid control circuit means, said input conductors being attached as parallel lines on a board and said control conductors attached as paralleled lines on said board extending perpendicularly to said input conductors, said diode means being releasably attached at the intersection of said lines and having terminals engaging the intersecting lines, said second presentation means including a sound reproducing means having at least three sound information channels and a control channel, said control channel including film advance signals of a selected first frequency and a tape stop signal of a different second frequency, frequency sensitive switch means connected to said control channel and having a film advance output line connected to actuate the film advance operating means and a tape stop output line, a multiple choice answer section means being coupled to the second selected code channels of said film and correspondingly establishing a correct answer output circuit and an incorrect answer output circuit, said control circuit means having a plurality of branch circuits connected to said matrix control conductors and including individual sound channel selection means connected to simultaneously activate the corresponding channel and energize the sound reproducing means, a semi-automatic film advance means connected to activate said operating means for advancing said film, an answer selection interlock means connected to disable said answer section means, and control circuit disconnect means to disconnect the control circuit means from said control control conductors, said individual sound selection means including latch circuits connected in common to the tape stop output line of said sound reproducing means, and said correct answer output circuit and said incorrect answer output circuit including switching means connected to and selectively operating said individual channel selection means and said circuit disconnect means of said control circuit means.

27. The instructional device of claim 26 including a disable means connected to said film advance operating means and to said decoding means to disable said decoding means during the advance of the film.

* * * * *